(12) United States Patent
Zhou et al.

(10) Patent No.: US 12,511,220 B2
(45) Date of Patent: Dec. 30, 2025

(54) INDUSTRIAL NETWORK-BASED CODELESS TRACKING ANALYTICS METHOD AND APPARATUS FOR INDUSTRIAL SOFTWARE

(71) Applicant: Siemens Aktiengesellschaft, Munich (DE)

(72) Inventors: Zhen Hua Zhou, Shanghai (CN); Wen Chao Zou, Shanghai (CN); Shao Tu Jia, Fuxin (CN); Tao Fei, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 311 days.

(21) Appl. No.: 18/262,599

(22) PCT Filed: Jan. 27, 2021

(86) PCT No.: PCT/CN2021/074007
§ 371 (c)(1),
(2) Date: Jul. 24, 2023

(87) PCT Pub. No.: WO2022/160141
PCT Pub. Date: Aug. 4, 2022

(65) Prior Publication Data
US 2024/0430151 A1 Dec. 26, 2024

(51) Int. Cl.
*G06F 11/3604* (2025.01)
*H04L 41/046* (2022.01)
(Continued)

(52) U.S. Cl.
CPC ........ *G06F 11/3612* (2013.01); *H04L 41/046* (2013.01); *H04L 41/12* (2013.01); *H04L 41/145* (2013.01)

(58) Field of Classification Search
None
See application file for complete search history.

(56) References Cited

U.S. PATENT DOCUMENTS 8,738,682 B2   5/2014   Dixon et al. ............. 709/201
10,764,244 B1  9/2020   Mestery et al.
(Continued)

FOREIGN PATENT DOCUMENTS

CN   103 532 746      1/2014   ............. H04L 12/24
CN   106888122 A      6/2017
(Continued)

OTHER PUBLICATIONS

Search Report for International Application No. PCT/CN2021/074007, 9 pages, Nov. 2, 2021.
(Continued)

*Primary Examiner* — Qing Chen
(74) *Attorney, Agent, or Firm* — Slayden Grubert Beard PLLC (57) ABSTRACT

Various embodiments of the teachings herein include industrial network-based codeless tracking analytics methods for industrial software. Some methods include: identifying an industrial intranet topology through detection, and generating a configuration map of the industrial field according to the topology and/or an application program running list of the software; injecting a sidecar agent for codeless runtime tracking to an edge device of a target field device in the industrial field according to the configuration map, and performing data synchronization for the edge device and the sidecar agent corresponding to the edge device, at least one tracking point existing between the target edge device and the sidecar agent corresponding to the target edge device, and the target edge device running at least one application program of the industrial software; and obtaining analysis data from the tracking point when the target edge device (Continued)

runs an application program therein, to analyze the industrial software.

19 Claims, 2 Drawing Sheets

(51) Int. Cl.
*H04L 41/12* (2022.01)
*H04L 41/14* (2022.01)

(56) References Cited

U.S. PATENT DOCUMENTS

| | | | |
|---|---|---|---|
| 2003/0088854 A1 | 5/2003 | Wygodny et al. | 717/130 |
| 2017/0187743 A1 | 6/2017 | Madou et al. | 726/25 |
| 2019/0213326 A1 | 7/2019 | Dykes | |
| 2019/0384691 A1* | 12/2019 | Kumar | G06F 11/302 |
| 2020/0007404 A1* | 1/2020 | Pinheiro | G06F 9/45508 |
| 2020/0082546 A1 | 3/2020 | Cui et al. | |
| 2021/0019194 A1 | 1/2021 | Bahl et al. | |

FOREIGN PATENT DOCUMENTS

| | | | |
|---|---|---|---|
| CN | 109 981 769 | 7/2019 | H04L 29/08 |
| CN | 110069358 A | 7/2019 | |
| CN | 110889707 A | 3/2020 | |
| CN | 111 130 883 | 5/2020 | H04L 12/24 |
| CN | 111917844 A | 11/2020 | |
| CN | 112130996 A | 12/2020 | |
| TW | 201610735 A | 3/2016 | |
| WO | 2018 044410 | 3/2018 | H04L 29/06 |

OTHER PUBLICATIONS

Sherwood, Rob et al., "A Platform for Unobtrusive Measurements on PlanetLab," USENIX, The Advanced Computing Systems Association, 6 pages, Oct. 9, 2006.
Extended European Search Report, Application No. 21921761.9, 11 pages, Aug. 21, 2024.
Chinese Office Action, Application No. 202180081213.X, 6 pages, Jul. 5, 2025.
Chinese Grant Decision, Application No. 202180081213.X, 4 pages, Nov. 3, 2025.

* cited by examiner

INDUSTRIAL NETWORK-BASED CODELESS TRACKING ANALYTICS METHOD AND APPARATUS FOR INDUSTRIAL SOFTWARE

CROSS-REFERENCE TO RELATED APPLICATIONS

This application is a U.S. National Stage Application of International Application No. PCT/CN2021/074007 filed Jan. 27, 2021, which designates the United States of America, the contents of which are hereby incorporated by reference in their entirety.

TECHNICAL FIELD

The present disclosure relates to the field of digitization. Various embodiments of the teachings herein include industrial network-based codeless tracking analytics methods and/or apparatus for industrial software.

BACKGROUND

Generic non-intrusive codeless tracking/analytics systems have become increasingly important for modern industrial ecosystems. Tracking information includes on-premise software analysis, a run log, dynamic performance analysis, and a fault test of a user behavior, to enhance optimization of a single edge point or a system within an entire industrial network environment by the system. The user behavior includes an event action, engineering programming, and the like; the fault test is, in particular, an automatic detection of security vulnerabilities; and the entire industrial network environment are centralized or distributed. The existing technologies do not provide a general tracking solution or architectural sample to support such an application scenario. Usually, after an industrial software is released, information needs to be collected for tracking experience during a software use process. Therefore, a particular technical solution is used to inject many monitoring points into a software product having been released. For example, event tracking is performed in a conventional web software page and image buttons thereof, to collect detection hotspots of operation data (including a mouse operation, a keyboard operation, and the like) of a user in the page, which facilitating background analysis and detection on, for example, which software functions are required by a customer. A codeless detection technology means that original code of software does not need to be changed, and tracking points are injected from third-party software.

Therefore, there are many unresolved problems in the existing technologies, and one of the unresolved problems is that most existing solutions are intrusive for existing code. To execute a tracking or recording system in which product-levels are distributed in a unified manner, a team usually needs to introduce a large amount of new intrusive code, and sometimes a current architecture is necessarily to be reconstructed if there is not good aspect oriented (AOP) execution in the architecture. If a product has been deployed to a terminal user, the situation is more complex. There is no codeless tracking solution and framework for industrial solutions in the current market. Software deployed to an industrial computer or an open controller is usually programmed by executable binary code in different programming languages, the programming languages including Python, C/C++, C #, Java, and the like; and sometimes is deployed by using a container such as a docker. Complexity of the solution making it very difficult for code injection.

Another problem is that in consideration of security and privacy, there is no or only a limited public network entry in most of time. In consideration of network security and data privacy, most operators do not intend to use a public PaaS/SaaS cloud solution. In addition, for an industrial environment, there is no or only a limited public network entry in most of time. In this case, most tracking services and service mesh architectures are based on cloud or a network technology that cannot be applied.

Still another problem is that, for an industrial network execution environment, it is difficult to execute a complex distributed solution. Modern industrial solutions are becoming increasingly complex, which include groups of a plurality of industrial computers, edge devices, and open controllers. Therefore, it is difficult for a network topology to be identified within a short time.

Still another problem is that, most customers are worried about the performance of the heavy solution for analysis and tracking on a user behavior. The terminal user does not expect performance of an entire system to be burdened by third-party analysis and tracking services, but the existing solutions are insufficiently quick, and therefore, it becomes more difficult for prediction.

In addition, in the industrial field, it is very difficult to perform an event tracking operation by using an event tracking tool on the market, because industrial devices include an edge device, an industrial computer, an open controller, and the like, and the industrial devices have no operation tools such as a mouse and a keyboard, and usually mainly have applications that keep running. Moreover, sometimes there is no execution log and diagnostic information when industrial software executes a software design, resulting in higher difficulty in dynamically acquiring an execution log and diagnostic information.

Moreover, industrial service meshes, which are an architectural pattern, are commonly used in the industrial field. However, performance and extension of microservice meshes are more excellent, but have not been widely used yet. Cutting-edge network companies usually use a service mesh architecture, but there is an extremely large difference in the industrial field. To be specific, many industrial networks are industrial intranets, such as Ethernet and Profinet, and many factories even have no network connection, and consequently the service mesh architecture cannot be applied.

SUMMARY

Therefore, a codeless tracking/analytics mechanism that can be applicable to the industrial field and that can perform automatic tracking point injection is required in the industry. Some embodiments include an industrial network-based codeless tracking analytics method for industrial software, including the following: S1: identifying an industrial intranet topology in an industrial field through detection, and generating a configuration map of the industrial field according to the industrial intranet topology and/or an application program running list of the industrial software; S2: injecting a sidecar agent for codeless runtime tracking to an edge device of a target field device in the industrial field according to the configuration map, and performing data synchronization for the edge device and the sidecar agent corresponding to the edge device, at least one tracking point existing between the target edge device and the sidecar agent corresponding to the target edge device, and the target edge device running at least one application program of the industrial software; and S3: obtaining, by the sidecar agent, analysis data from the tracking point when the target edge device runs an application program therein, to analyze the industrial software.

In some embodiments, S2 further includes: reading an executable file of the application program in the edge device of the target field device, and dynamically injecting, by the sidecar agent, a tracking point into the application program based on the executable file for event tracking, injecting the sidecar agent for codeless runtime tracking into the edge device of the target field device in the industrial field according to the configuration map, and performing data synchronization for the edge device and the sidecar agent corresponding to the edge device.

In some embodiments, S2 further includes: obtaining source code of the industrial software, and converting the source code into a virtual code tree, and mapping the virtual code tree and an executable file; and dynamically injecting, by the sidecar agent, a tracking point into the application program based on the executable file for event tracking, and injecting the sidecar agent for codeless runtime tracking into the edge device of the target field device in the industrial field according to the configuration map.

In some embodiments, S2 further includes establishing communication among all sidecar agents in the industrial field according to the industrial intranet topology.

In some embodiments, S3 further includes obtaining, by the sidecar agent, runtime node data from the tracking point when the target edge device runs the application program therein to the tracking point, and performing classification and format unification on all node data, to analyze the industrial software.

In some embodiments, before step S1, the method further includes installing an edge device or local server of a hybrid control plane in the industrial field.

In some embodiments, the edge device of target field device runs a plurality of application programs of the industrial software, each of the application programs being corresponding to one sidecar agent.

In some embodiments, S2 further includes: formulating an injection policy according to an analysis purpose of the industrial software, and injecting the sidecar agent based on the injection policy and, a process tree and historical data of the industrial software according to the configuration map.

In some embodiments, when the application program is accommodated in the virtual machine, S2 further includes passing through the virtual machine to execute the injection of the sidecar agent.

As another example, some embodiments include an industrial network-based codeless tracking analytics system for industrial software, including: a processor; and a memory coupled with the processor, the memory having instructions stored therein, the instructions, when executed by the processor, causing the processor to execute actions, the actions including: S1: identifying an industrial intranet topology in an industrial field through detection, and generating a configuration map of the industrial field according to the industrial intranet topology and/or an application program running list of the industrial software; S2: injecting a sidecar agent for codeless runtime tracking to an edge device of a target field device in the industrial field according to the configuration map, and performing data synchronization for the edge device and the sidecar agent corresponding to the edge device, at least one tracking point existing between the target edge device and the sidecar agent corresponding to the target edge device, and the target edge device running at least one application program of the industrial software; and S3: obtaining, by the sidecar agent, analysis data from the tracking point when the target edge device runs an application program therein, to analyze the industrial software.

In some embodiments, S2 further includes: reading an executable file of the application program in the edge device of the target field device, and dynamically injecting, by the sidecar agent, a tracking point into the application program based on the executable file for event tracking, injecting the sidecar agent for codeless runtime tracking into the edge device of the target field device in the industrial field according to the configuration map, and performing data synchronization for the edge device and the sidecar agent corresponding to the edge device.

In some embodiments, S2 further includes: obtaining source code of the industrial software, and converting the source code into a virtual code tree, and mapping the virtual code tree and an executable file; and dynamically injecting, by the sidecar agent, a tracking point into the application program based on the executable file for event tracking, and injecting the sidecar agent for codeless runtime tracking into the edge device of the target field device in the industrial field according to the configuration map.

In some embodiments, S2 further includes establishing communication among all sidecar agents in the industrial field according to the industrial intranet topology.

In some embodiments, S3 further includes obtaining, by the sidecar agent, runtime node data from the tracking point when the target edge device runs the application program therein to the tracking point, and performing classification and format unification on all node data, to analyze the industrial software.

In some embodiments, before action S1, the actions further include installing an edge device or local server of a hybrid control plane in the industrial field.

In some embodiments, the edge device of target field device runs a plurality of application programs of the industrial software, each of the application programs being corresponding to one sidecar agent.

In some embodiments, S2 further includes: formulating an injection policy according to an analysis purpose of the industrial software, and injecting the sidecar agent based on the injection policy and, a process tree and historical data of the industrial software according to the configuration map.

In some embodiments, when the application program is accommodated in the virtual machine, S2 further includes passing through the virtual machine to execute the injection of the sidecar agent.

As another example, some embodiments include an industrial network-based codeless tracking analytics apparatus for industrial software, including: a detection and identification apparatus, configured to: identify an industrial intranet topology in an industrial field through detection, and generate a configuration map of the industrial field according to the industrial intranet topology and/or an application program running list of the industrial software; an injection apparatus, configured to: inject a sidecar agent for codeless runtime tracking to an edge device of a target field device in the industrial field according to the configuration map, and perform data synchronization for the edge device and the sidecar agent corresponding to the edge device, at least one tracking point existing between the target edge device and the sidecar agent corresponding to the target edge device, and the target edge device running at least one application program of the industrial software; and an analysis apparatus, configured to: obtain analysis data from the tracking point when the target edge device runs an application program therein, to analyze the industrial software.

As another example, some embodiments include a computer program product, where the computer program product is tangibly stored on a computer-readable medium and includes computer-executable instructions, the computer-executable instructions, when being executed, causing at least one processor to perform one or more of the methods described herein.

As another example, some embodiments include a computer-readable medium, storing computer-executable instructions, the computer-executable instructions, when being executed, causing at least one processor to perform one or more of the methods described herein.

DETAILED DESCRIPTION

The teaching of the present disclosure provides codeless and non-intrusive solutions for existing source code of industrial software, and is applicable to industrial networks and devices. In addition, various embodiments of the teachings herein require very low configuration costs and development and operation costs, and the existing source code of the industrial software does not need to be modified. Specific examples incorporating teachings of the present disclosure are described below with reference to the accompanying drawings.

Some examples of the teachings herein include an industrial network-based codeless tracking analytics mechanism for industrial software, which inject a tracking point based on an industrial service mesh by using an intelligent sidecar agent, and is driven by using a hybrid control plane at edge, to perform industrial network runtime tracking during running of an industrial device.

An architecture of the industrial network-based codeless tracking analytics mechanism for industrial software as described herein may provide a modern loose-coupled and non-intrusive architecture, which is applicable to industrial networks and devices. The industrial service mesh provided in the present invention combines a plurality of sidecar agents for codeless runtime tracking, and can be driven by a hybrid control plane. Communication may be high-speed communication based on a hybrid virtual data platform core service between each two sidecar agents. All components can be easily installed or automatically injected into an industrial computer or an edge device. Any existing engineering or runtime solution can be easily integrated into the present invention, requires very low configuration costs and development and operation costs, and existing source code of industrial software does not need to be modified.

Some example include an industrial network-based codeless tracking analytics method for industrial software, including the following:

First, step S1 includes: identify an industrial intranet topology in an industrial field through detection, and generate a configuration map of the industrial field according to the industrial intranet topology and/or an application program running list of the industrial software. In some embodiments, the industrial field is a factory, and an industrial intranet (such as Ethernet and Profinet) is used in the industrial field. The industrial field industrial includes a plurality of field devices, where an industrial computer and an open controller serve as edge devices. When used as Internet of Things edge calculation nodes of cloud of an industrial Internet of Things, the industrial computer and the open controller are edge devices.

The edge device runs a plurality of programs therein, including a running state alarm system (NodeJS), a detection machine and transmission belt control process (GCC, which drives PLC 10 through RIB), an object identification visual algorithm process (Python), a robot control process and driving (GCC in a Docker), and the like. In an application scenario of this embodiment, there is no unified log system and user behavior analysis system for industrial software run by the factory, and there is also a lack of middleware for performance analysis, system security analysis, and the like. If the foregoing functions need to be added, all source code that have been deployed for application of the industrial software need to be modified, which has a high risk and requires extremely high costs. Therefore, the teachings herein may be used to perform a codeless industrial service mesh, and deploy a sidecar agent for each application program of each edge device, to collect analysis data of industrial software.

Figure 1:
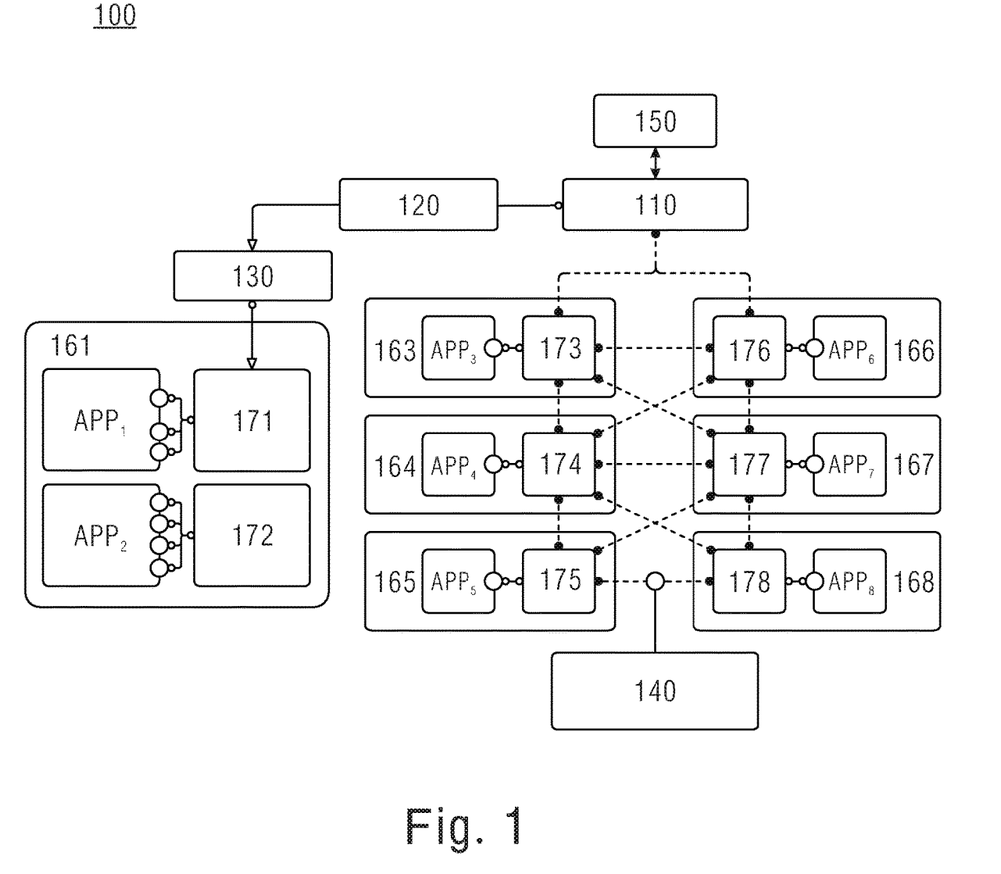
FIG. 1 is a schematic architectural diagram showing an industrial network-based codeless tracking analytics device for industrial software incorporating teachings of the present disclosure.

FIG. 1 is a schematic architectural diagram showing an industrial network-based codeless tracking analytics device 100 for industrial software incorporating teachings of the present disclosure. As shown in FIG. 1, the codeless tracking analytics device 100 includes a hybrid control plane 110 at edge, a configuration detector 120, an injector 130, a plurality of sidecar agents, a hybrid data platform 140, and a controller 150. There are many embedded devices in an industrial field, such as edge devices. The edge devices are connected to industrial cloud, to assist the industrial cloud in performing calculation. A sidecar agent is allocated to each edge device, and at least one application program of the industrial software is run in the edge device.

In some embodiments, before step S1, the method further includes installing an edge device or local server of the hybrid control plane 110 in the industrial field. In this embodiment, the hybrid control plane 110 is installed in a server industrial computer (not shown) of the factory that serves as a local server.

The hybrid control plane 110 is a core apparatus of the codeless tracking analytics device for industrial software 100, which can be deployed to the edge device or local server, and is optimized to be applicable to an industrial network and an industrial computer environment. The hybrid control plane 110 includes an industrial platform adapter and a codeless tracking engine, which serves as an entry for visualizing tracking data aggregation through the controller 150, and provides scalable public application program interface (API) for tracking rule configuration. The codeless tracking engine collects telemetry data from the sidecar agent by using the hybrid data platform 140. The hybrid control plane 110 is similar to a final definition of a general control platform, but is optimized to be applicable to an industrial network, to meet industrial standards by using the industrial platform adapter, for example, OPC UA, Profinet, Ethercat, Ethernet, and Modbus IP; and is also applicable to execution of a process image (message broker).

The configuration detector 120 detects an on-premise network topology under help of a runtime discovery service (RDS) in the sidecar agent, and is further configured to detect a container type and a running process list of the edge device or industrial computer. The configuration detector 120 finally generates a configuration map for the injector 130.

Once the configuration detector 120 completes the work thereof, the injector 130 is started. The injector 130 injects a sidecar agent for codeless runtime tracking into a target device, and attaches the sidecar agent to a particular process recommended by the configuration map. Settings of an application environment is also automatically completed by a changed service.

In some embodiments, S2 includes: inject a sidecar agent for codeless runtime tracking to an edge device of a target field device in the industrial field according to the configuration map, and perform data synchronization for the edge device and the sidecar agent corresponding to the edge device, at least one tracking point existing between the target edge device and the sidecar agent corresponding to the target edge device, and the target edge device running at least one application program of the industrial software. In some embodiments, the edge device of target field device runs a plurality of application programs of the industrial software, each of the application programs being corresponding to one sidecar agent.

Specifically, according to the configuration map, the factory has a first edge device 161, a third edge device 163, a fourth edge device 164, a fifth edge device 165, a sixth edge device 166, a seventh edge device 167, and an eighth edge device 168. The first edge device 161 runs two application programs of the industrial software, which are respectively a first application program $APP_1$ and a second application program $APP_2$. The third edge device 163 runs one application program, which is a third application program $APP_3$. The fourth edge device 164 runs one application program, which is a fourth application program $APP_4$. The fifth edge device 165 runs one application program, which is a fifth application program $APP_5$. The sixth edge device 166 runs one application program, which is a sixth application program $APP_6$. The seventh edge device 167 runs one application program, which is a seventh application program $APP_7$. The eighth edge device 168 runs one application program, which is an eighth application program $APP_8$. Each application program should be deployed with one sidecar agent.

Therefore, a corresponding first sidecar agent 171 is allocated to the first application program $APP_1$, a corresponding second sidecar agent 172 is allocated to the second application program $APP_2$, a corresponding third sidecar agent 173 is allocated to the third application program $APP_3$, a corresponding fourth sidecar agent 174 is allocated to the fourth application program $APP_4$, a corresponding fifth sidecar agent 175 is allocated to the fifth application program $APP_5$, a corresponding sixth sidecar agent 176 is allocated to the sixth application program $APP_6$, a corresponding seventh sidecar agent 177 is allocated to the seventh application program $APP_7$, and a corresponding eighth sidecar agent 178 is allocated to the eighth application program $APP_8$. All the foregoing sidecar agents are injected into corresponding edge devices by using the injector 130. The hybrid data platform 140 controls the sidecar agents, so that data between the edge devices and the sidecar agents are always synchronized. The hybrid data platform 140 is configured for communication between the sidecar agents.

Figure 2:
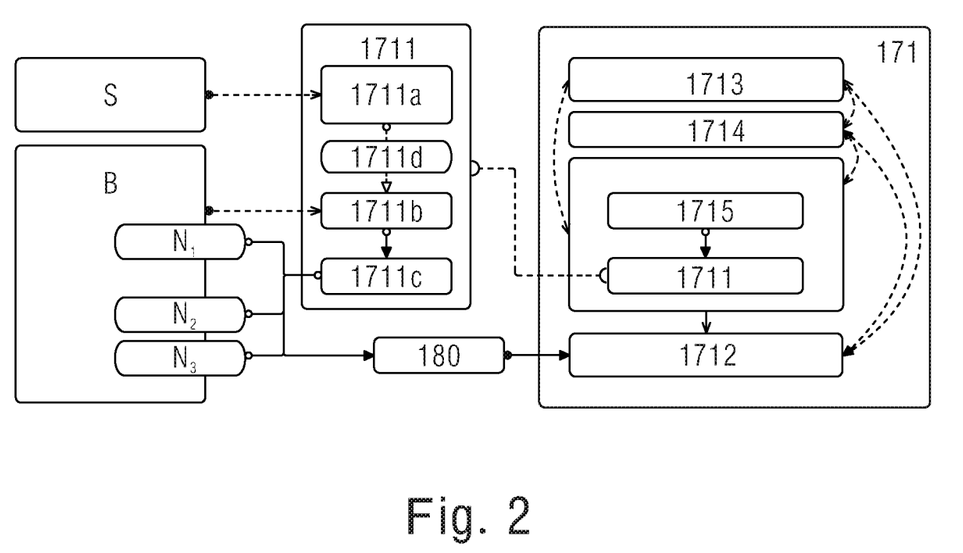
FIG. 2 is a schematic structural diagram showing a sidecar agent and an intelligent tracking injector of an industrial network-based codeless tracking analytics device for industrial software incorporating teachings of the present disclosure.

FIG. 2 is a schematic structural diagram showing a sidecar agent and an intelligent tracking injector of an industrial network-based codeless tracking analytics device for industrial software incorporating teachings of the present disclosure. The sidecar agent and an injection process thereof are described below by using the first sidecar agent 171 as an example. As shown in FIG. 2, the first sidecar agent 171 includes a tracking injector 1711, a data aggregator 1712, a communication configurator 1713, a failure injector 1714, and a virtual machine adapter 1715. The tracking injector 1711 is configured for sidecar agent injection, and further includes a virtual code tree analyzer 1711a, a binary analyzer 1711b, a binary injector 1711c, and a mapper 1711d.

The data aggregator 1712 is configured to collect runtime node data, and perform classification and format unification on all node data, to analyze the industrial software. The communication configurator 1713 is configured to configure communication between all sidecar agents. The failure injector 1714 is configured to perform an auxiliary function, and when whether an application program runs well is uncertain, error information is intentionally injected into an intelligent detection run log, to detect whether the application program can run well under a failure condition. The virtual machine adapter 1715 is configured to pass through a virtual machine accommodating application programs. Runtime failure injection causes generation of failure data or code for a network failure test, and automatic system defect test and simulation tracks a failure, to enhance system stability. The runtime failure injection is a general design pattern, and does not need to be designed again for industrial application.

As shown in FIG. 2, S2 further includes: formulating an injection policy according to an analysis purpose of the industrial software, and injecting the sidecar agent based on the injection policy and, a process tree and historical data of the industrial software according to the configuration map. When the application program is accommodated in the virtual machine, step S2 further includes: passing through the virtual machine to execute the injection of the sidecar agent. A process tree of the industrial software refers to a list of all processes of application programs currently run by the current industrial computer, where some application program has more than one process. Sometimes an APP package is run in a container or a virtual machine, and injection of the sidecar agent to the application program can be completed only in a case of passing through the container.

During actual application of industrial software, some industrial software providers provide source code of industrial software, and some providers do not provide source code of industrial software. Therefore, based on the two cases that an industrial software provider provides source code and does not provide source code, there are different sidecar agent injection steps and processes.

In a case that an industrial software provider does not provide source code, S2 includes: reading, by the binary analyzer 1711b, an executable file of the application program in the edge device of the target field device, and dynamically injecting, by the binary injector 1711c, a tracking point into the application program based on the executable file for event tracking, injecting the sidecar agent for codeless runtime tracking into the edge device of the target field device in the industrial field according to the configuration map, and performing data synchronization for the edge device and the sidecar agent corresponding to the edge device.

The industrial software has source code S, and the source code S is an executable file B after being compiled. If the industrial software does not provide the source code S, the binary analyzer 1711b directly reads a compiled executable file and directly feeds the compiled executable file into the binary injector 1711c, then after analyzing the compiled executable file, the binary injector 1711c performs injection. For example, in FIG. 2, after analyzing the executable file, the binary injector 1711c injects three tracking points $N_1$, $N_2$, and $N_3$ according to an analysis result.

The binary injector 1711c injects the tracking points into a binary executable file. The tracking points are code snippets. For example, for the binary format Python, it is difficult to locate a particular function position, and therefore it needs to rely on a result of the binary analyzer 1711b. However, sometimes this is still insufficient for an ELF format, so that an injected point is insufficiently accurate. In this case, if an end customer can provide source code for binary application, assistance of the virtual code tree analyzer 1711a is required, which greatly improves injection accuracy. It should be noted that, due to security non-functional requirements of the customer, an automatic injection behavior needs to be accepted by the end customer and requires a signed permission.

Therefore, in a case that the industrial software provider provides the source code S, S2 further includes: obtaining source code of the industrial software; converting, by the virtual code tree analyzer 1711a, the source code into a virtual code tree, and mapping the virtual code tree and the executable file B by using the mapper 1711d; and dynamically injecting, by the sidecar agent, a tracking point based on the executable file for event tracking, and injecting the sidecar agent for codeless runtime tracking into the edge device of the target field device in the industrial field according to the configuration map.

In some embodiments, S2 further includes establishing, by the communication configurator 1713, communication among all sidecar agents in the industrial field according to the industrial intranet topology.

S3 includes: obtain, by the sidecar agent, analysis data from the tracking point by using a collector 180 when the target edge device runs an application program therein, to analyze the industrial software. In some embodiments, S3 further includes: obtaining, by the sidecar agent, runtime node data from the tracking point when the target edge device runs the application program therein to the tracking point, and performing, by using the data aggregator 1712, classification and format unification on all node data, to analyze the industrial software.

As shown in FIG. 2, the collector 180 obtains runtime node data from the tracking point $N_1$, $N_2$, and $N_3$, and transmits the runtime node data to the data aggregator 1712. The data aggregator 1712 performs classification and format unification on all the node data to analyze the industrial software, so as to summarize and unify the data for subsequent indexing. The data aggregator 1712 collects codeless tracking data from all injected nodes, performs data initialization screening and aggregation, and also collects main tracking data. Finally, the data aggregator 1712 runs together with a target user software execution process in the sidecar agent 171.

The data aggregator 1712 transmits data by using the communication configurator 1713, and the communication configurator 1713 needs to read data from the hybrid control plane 110 to unify aggregation results.

In addition, network services of the sidecar agent include a plurality of network designs, for example, a circuit breaker, load balancing, traffic control, and health diagnosis, which all optimize the industrial network, and provide CTR ISM control.

In addition, the sidecar agent for codeless runtime tracking is also a core apparatus of the codeless tracking analytics device for industrial software 100 provided in the present invention. The sidecar agent is actually a process independent of an existing project or a runtime application. The sidecar agent triggers many assemblies, for example, an intelligent tracking injector, a network service (for example, discovering a server during running), and a runtime failure injection and tracking data aggregator.

The hybrid data platform 140 executes a high-speed switching fabric between each two sidecar agents. The hybrid data platform 140 is a virtual execution, because this is a part of the sidecar agent and is based on a core service. The hybrid data platform 140 does not forcibly controls all TCP network communication, which is different from other popular service mesh solutions in the market, as executed by all initial containers. The hybrid data platform 140 only screens and forcibly controls data flows related to tracking, which has a high speed in Linux Kernel through eBPF, and does not cause additional performance degradation. The controller 150 is configured to visualize aggregation of tracking data.

Some embodiments include an industrial network-based codeless tracking analytics system for industrial software, including: a processor; and a memory coupled with the processor, the memory having instructions stored therein, the instructions, when executed by the processor, causing the processor to execute actions including: S1: identifying an industrial intranet topology in an industrial field through detection, and generating a configuration map of the industrial field according to the industrial intranet topology and/or an application program running list of the industrial software; S2: injecting a sidecar agent for codeless runtime tracking to an edge device of a target field device in the industrial field according to the configuration map, and performing data synchronization for the edge device and the sidecar agent corresponding to the edge device, at least one tracking point existing between the target edge device and the sidecar agent corresponding to the target edge device, and the target edge device running at least one application program of the industrial software; and S3: obtaining, by the sidecar agent, analysis data from the tracking point when the target edge device runs an application program therein, to analyze the industrial software.

In some embodiments, S2 further includes: reading an executable file of the application program in the edge device of the target field device, and dynamically injecting, by the sidecar agent, a tracking point into the application program based on the executable file for event tracking, injecting the sidecar agent for codeless runtime tracking into the edge device of the target field device in the industrial field according to the configuration map, and performing data synchronization for the edge device and the sidecar agent corresponding to the edge device.

In some embodiments, S2 further includes: obtaining source code of the industrial software, and converting the source code into a virtual code tree, and mapping the virtual code tree and an executable file; and dynamically injecting, by the sidecar agent, a tracking point into the application program based on the executable file for event tracking, and injecting the sidecar agent for codeless runtime tracking into the edge device of the target field device in the industrial field according to the configuration map.

In some embodiments, S2 further includes: establishing communication among all sidecar agents in the industrial field according to the industrial intranet topology.

In some embodiments, S3 further includes obtaining, by the sidecar agent, runtime node data from the tracking point when the target edge device runs the application program therein to the tracking point, and performing classification and format unification on all node data, to analyze the industrial software.

In some embodiments, before action S1, the actions further include: installing an edge device or local server of a hybrid control plane in the industrial field.

In some embodiments, the edge device of target field device runs a plurality of application programs of the industrial software, each of the application programs being corresponding to one sidecar agent.

In some embodiments, action S2 further includes: formulating an injection policy according to an analysis purpose of the industrial software, and injecting the sidecar agent based on the injection policy and, a process tree and historical data of the industrial software according to the configuration map.

In some embodiments, when the application program is accommodated in the virtual machine, action S2 further includes: passing through the virtual machine to execute the injection of the sidecar agent.

Some embodiments include an industrial network-based codeless tracking analytics apparatus for industrial software, including: a detection and identification apparatus, configured to: identify an industrial intranet topology in an industrial field through detection, and generate a configuration map of the industrial field according to the industrial intranet topology and/or an application program running list of the industrial software; an injection apparatus, configured to: inject a sidecar agent for codeless runtime tracking to an edge device of a target field device in the industrial field according to the configuration map, and perform data synchronization for the edge device and the sidecar agent corresponding to the edge device, at least one tracking point existing between the target edge device and the sidecar agent corresponding to the target edge device, and the target edge device running at least one application program of the industrial software; and an analysis apparatus, configured to: obtain analysis data from the tracking point when the target edge device runs an application program therein, to analyze the industrial software.

Some embodiments include a computer program product, where the computer program product is tangibly stored on a computer-readable medium and includes computer-executable instructions, the computer-executable instructions, when being executed, causing at least one processor to perform one or more of the methods described herein.

Some embodiments include a computer-readable medium, storing computer-executable instructions, the computer-executable instructions, when being executed, causing at least one processor to perform one or more of the methods described herein.

Compared with a conventional tracking analytics mechanism, an architecture of the industrial network-based codeless tracking analytics mechanism for industrial software provided in the present invention has many advantages for a real factory or manufactory. The teachings of the present disclosure may be codeless and non-intrusive for existing source code of industrial software, which is implemented by using a sidecar agent and an injector. By using a Kernel service in a hybrid data platform, speeds in analysis and tracking for industrial software and network flow hijacking are high, which is implemented by using eBPF. The eBPF can directly inject and run tracking code in Linus Kernel. In addition, the teachings are applicable an industrial network environment, and require no other configuration costs.

The architecture described herein can be applied in many industrial systems regardless of product-levels or development projects, to implement a codeless analytics tracking function of industrial software; and additional costs for this is very low. The various embodiments can be easily deployed to real industrial environments, including an industrial computer, an edge device, an open controller, or another type of edge device that operates a machine by using a PLC or robot. In addition, this does not require additional development and maintenance work. After some automatic configurations, the sidecar agent is injected into a current deployed device, tracking code is injected into a configured running process by using an injector, and after data is collected, analysis on the industrial software is implemented. The embodiments can track data for the entire industrial ecosystem and generate a report.

Although the teachings of the present disclosure have been described in detail through the above exemplary embodiments, it should be understood that the above description should not be considered as a limitation on the present disclosure. For a person skilled in the art, various modifications and replacements to the present invention will be apparent after reading the above content. Therefore, the protection scope of the present disclosure should be subject to the appended claims. In addition, any reference numeral in the claims shall not be construed as limiting the claims; the word "include/comprise" does not exclude apparatuses or steps not listed in other claims or the specification; and the terms such as "first" and "second" are only used for indicating the names and do not indicate any particular order.

What is claimed is:

1. A method for performing industrial network-based codeless tracking analytics for an industrial software, the method comprising:
    identifying an industrial intranet topology in an industrial field through detection, and generating a configuration map of the industrial field according to the industrial intranet topology and/or an application program running a list of the industrial software;
    injecting a sidecar agent for codeless runtime tracking into an edge device of a target field device in the industrial field according to the configuration map of the industrial field, and performing data synchronization for the edge device of the target field device and the sidecar agent corresponding to the edge device of the target field device, wherein at least one tracking point exists between the edge device of the target field device and the sidecar agent corresponding to the edge device of the target field device;
    obtaining, by the sidecar agent, analysis data from the at least one tracking point when the edge device of the target field device runs an application program of the industrial software therein, to analyze the industrial software; and
    running, by the edge device of target field device, the application program of the industrial software to perform industrial network-based codeless tracking analytics, wherein the application program of the industrial software corresponds to the sidecar agent.

2. The method according to claim 1, further comprising:
    reading an executable file of the application program of the industrial software in the edge device of the target field device;
    dynamically injecting, using the sidecar agent, a tracking point into the application program of the industrial software based on the executable file of the application program of the industrial software for event tracking;

injecting the sidecar agent for codeless runtime tracking into the edge device of the target field device in the industrial field according to the configuration map of the industrial field; and performing data synchronization for the edge device of the target field device and the sidecar agent corresponding to the edge device of the target field device.

3. The method according to claim 1, further comprising:

obtaining source code of the industrial software;

converting the source code of the industrial software into a virtual code tree;

mapping the virtual code tree and an executable file;

dynamically injecting, using the sidecar agent, a tracking point into the application program of the industrial software based on the executable file of the application program of the industrial software for event tracking; and injecting the sidecar agent for codeless runtime tracking into the edge device of the target field device in the industrial field according to the configuration map of the industrial field.

4. The method according to claim 1, further comprising establishing communication among all sidecar agents in the industrial field according to the industrial intranet topology in the industrial field.

5. The method according to claim 1, further comprising:

obtaining, using the sidecar agent, runtime node data from the at least one tracking point when the edge device of the target field device runs the application program of the industrial software therein; and performing classification and format unification on all node data, to analyze the industrial software.

6. The method according to claim 1, further comprising installing an edge device or a local server of a hybrid control plane in the industrial field.

7. The method according to claim 1, wherein the edge device of the target field device runs a plurality of application programs of the industrial software, and wherein each application program of the plurality of application programs corresponds to one sidecar agent.

8. The method according to claim 1, further comprising:

formulating an injection policy according to an analysis purpose of the industrial software; and injecting the sidecar agent based on the injection policy and a process tree and historical data of the industrial software according to the configuration map of the industrial field.

9. The method according to claim 1, further comprising running a virtual machine to execute the injection of the sidecar agent, wherein the application program of the industrial software is stored in the virtual machine.

10. A system for performing industrial network-based codeless tracking analytics for an industrial software, the system comprising:

a processor; and a memory coupled to the processor, the memory having instructions stored therein, the instructions, when executed by the processor, causing the processor to:

identify an industrial intranet topology in an industrial field through detection, and generate a configuration map of the industrial field according to the industrial intranet topology and/or an application program running a list of the industrial software;

inject a sidecar agent for codeless runtime tracking into an edge device of a target field device in the industrial field according to the configuration map of the industrial field, and perform data synchronization for the edge device of the target field device and the sidecar agent corresponding to the edge device of the target field device, wherein at least one tracking point exists between the edge device of the target field device and the sidecar agent corresponding to the edge device of the target field device;

obtain, by the sidecar agent, analysis data from the at least one tracking point when the edge device of the target field device runs an application program of the industrial software therein, to analyze the industrial software; and run, by the edge device of target field device, the application program of the industrial software to perform industrial network-based codeless tracking analytics, wherein the application program of the industrial software corresponds to the sidecar agent.

11. The system according to claim 10, wherein the instructions, when executed by the processor, further cause the processor to:

read an executable file of the application program of the industrial software in the edge device of the target field device;

dynamically inject, using the sidecar agent, a tracking point into the application program of the industrial software based on the executable file of the application program of the industrial software for event tracking;

inject the sidecar agent for codeless runtime tracking into the edge device of the target field device in the industrial field according to the configuration map of the industrial field; and perform data synchronization for the edge device of the target field device and the sidecar agent corresponding to the edge device of the target field device.

12. The system according to claim 10, wherein the instructions, when executed by the processor, further cause the processor to:

obtain source code of the industrial software;

convert the source code of the industrial software into a virtual code tree;

map the virtual code tree and an executable file;

dynamically inject, using the sidecar agent, a tracking point into the application program of the industrial software based on the executable file of the application program of the industrial software for event tracking; and inject the sidecar agent for codeless runtime tracking into the edge device of the target field device in the industrial field according to the configuration map of the industrial field.

13. The system according to claim 10, wherein the instructions, when executed by the processor, further cause the processor to establish communication among all sidecar agents in the industrial field according to the industrial intranet topology in the industrial field.

14. The system according to claim 10, wherein the instructions, when executed by the processor, further cause the processor to:

obtain, using the sidecar agent, runtime node data from the at least one tracking point when the edge device of the target field device runs the application program of the industrial software therein; and perform classification and format unification on all node data, to analyze the industrial software.

15. The system according to claim 10, wherein the instructions, when executed by the processor, further cause the processor to install an edge device or a local server of a hybrid control plane in the industrial field.

16. The system according to claim 10, wherein the edge device of the target field device runs a plurality of application programs of the industrial software, and wherein each application program of the plurality of application programs corresponds to one sidecar agent.

17. The system according to claim 10, wherein the instructions, when executed by the processor, further cause the processor to:
 formulate an injection policy according to an analysis purpose of the industrial software; and
 inject the sidecar agent based on the injection policy and a process tree and historical data of the industrial software according to the configuration map of the industrial field.

18. The system according to claim 10, wherein the instructions, when executed by the processor, further cause the processor to:
 running a virtual machine to execute the injection of the sidecar agent, wherein the application program of the industrial software is stored in the virtual machine.

19. An apparatus for performing industrial network-based codeless tracking analytics for an industrial software, the apparatus comprising:
 a processor; and
 a memory coupled to the processor, the memory storing therein:
  a detection and identification apparatus configured to identify an industrial intranet topology in an industrial field through detection, and generate a configuration map of the industrial field according to the industrial intranet topology and/or an application program running a list of the industrial software;
  an injection apparatus configured to inject a sidecar agent for codeless runtime tracking into an edge device of a target field device in the industrial field according to the configuration map of the industrial field, and perform data synchronization for the edge device of the target field device and the sidecar agent corresponding to the edge device of the target field device, wherein at least one tracking point exists between the edge device of the target field device and the sidecar agent corresponding to the edge device of the target field device;
 an analysis apparatus configured to obtain, by the sidecar agent, analysis data from the at least one tracking point when the edge device of the target field device runs an application program of the industrial software therein, to analyze the industrial software; and
 an execution apparatus configured to run, by the edge device of target field device, the application program of the industrial software to perform industrial network-based codeless tracking analytics, wherein the application program of the industrial software corresponds to the sidecar agent.

* * * * *